United States Patent [19]

Cherng

[11] Patent Number: 5,234,122
[45] Date of Patent: Aug. 10, 1993

[54] POWER FUEL TANK COVER FOR AUTOMOBILES

[76] Inventor: Bing J. Cherng, No. 38 3, Alley 23, Lane 1165, Min Chu 1st, Kaohsiung, Taiwan

[21] Appl. No.: 927,347
[22] Filed: Aug. 10, 1992
[51] Int. Cl.⁵ .............................................. B65D 55/00
[52] U.S. Cl. .................................... 220/211; 220/263; 220/335; 220/86.2; 220/DIG. 33; 296/97.22; 292/201
[58] Field of Search ............. 220/211, 335, 263, 86.2, 220/DIG. 33; 296/97, 22; 292/201

[56] References Cited

U.S. PATENT DOCUMENTS

| 4,030,322 | 6/1977 | Pettit | 220/211 X |
| 5,066,062 | 11/1991 | Sekulovski | 296/97.22 |
| 5,072,986 | 12/1991 | Tai et al. | 296/97.22 |
| 5,076,622 | 12/1991 | Detweiler | 292/201 |
| 5,145,081 | 9/1992 | Gravino | 220/86.2 |

FOREIGN PATENT DOCUMENTS 0156422 9/1983 Japan ........................... 296/97.22

*Primary Examiner*—Allan N. Shoap
*Assistant Examiner*—Paul A. Schwarz
*Attorney, Agent, or Firm*—Pro-Techtor International

[57] ABSTRACT

This invention relates to a power fuel tank cover and in particular to one including a motor, a collar having a circular member and a tubular member formed at one side thereof, a worm rod inserted into the tubular member of the collar, a sleeve fitted into said collar, a worm gear mounted on the sleeve and engaged with the worm rod, an actuating cylinder with external threads being threadedly engaged with the center hole of the worm gear, a lid pivotally connected with an upper portion of the actuating cylinder and having a seat with a groove at a bottom, a positioning plate on a top and a hole extending through the seat and the positioning plate for receiving a ball, a plug and a spring, a connecting member pivotally connected between the collar and the lid, and a press plate threadedly engaged with the positioning plate by a screw connected with a linking rod via a ring which is in turn connected with a fixing plate, whereby the fuel tank may be automatically opened and closed simply by pressing a switch near the driver seat hence facilitating the operation of filling gasoline.

5 Claims, 5 Drawing Sheets

POWER FUEL TANK COVER FOR AUTOMOBILES

FIELD OF THE INVENTION

This invention relates to a power fuel tank cover for automobiles.

BACKGROUND OF THE INVENTION

It has been found that the driver must get off the automobile to manually open the fuel tank cover in order to fill gasoline thereby causing much inconvenience.

SUMMARY OF THE INVENTION

Therefore, it is an object of the present invention to provide a device which may automatically open and close the fuel tank cover as required.

It is the primary object of the present invention to provide a power fuel tank cover for automobiles which may open and close the fuel tank cover of an automobile simply by pressing a switch near the driver seat.

It is another object of the present invention to provide a power fuel tank cover for automobiles which may control the opening and closing of a fuel tank as required.

It is still another object of the present invention to provide a power fuel tank cover for automobiles which is facile to operate.

It is still another object of the present invention to provide a power fuel tank cover for automobiles which is simple in construction.

It is a further object of the present invention to provide a power fuel tank cover for automobiles which is low in cost.

Other objects and merits and a fuller understanding of the present invention will be obtained by those having ordinary skill in the art when the following detailed description of the preferred embodiment is read in conjunction with the accompanying drawings.

BEST MODE OF CARRYING OUT THE INVENTION

Figure 1:
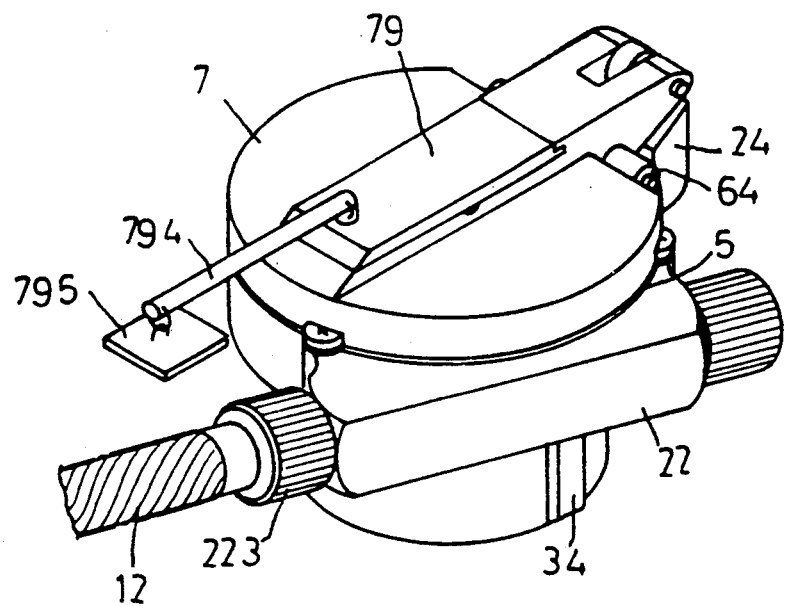
FIG. 1 is a perspective view of the present invention.
Figure 2:
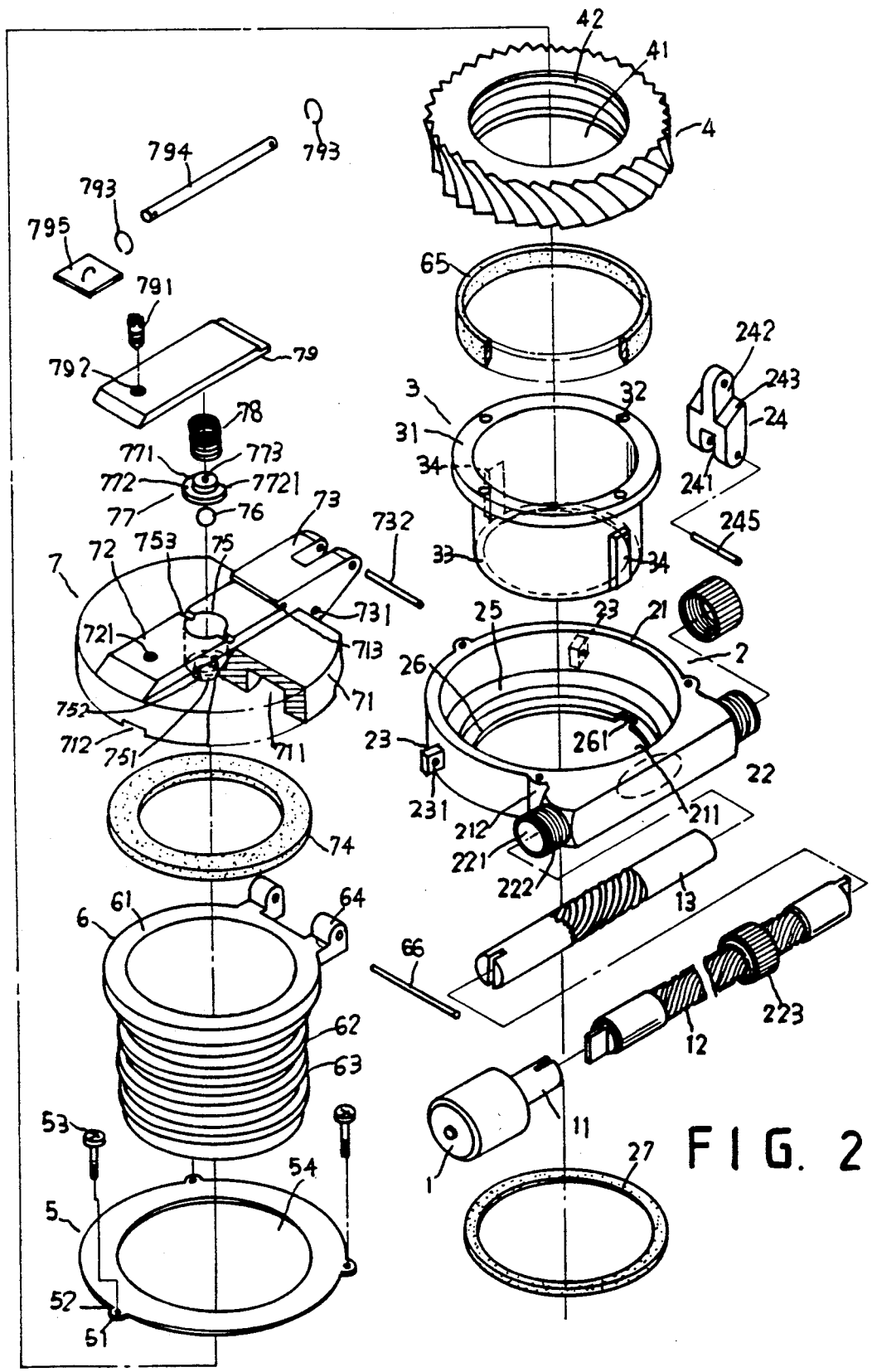
FIG. 2 is an exploded view of the present invention.

With reference to the drawings and in particular to FIGS. 1 and 2 thereof, the present invention mainly comprises a motor 1, a collar 2, a sleeve 3, a worm gear 4, an annular member 5, an actuating cylinder 6, and a lid 7. The motor 1 is provided with an axle 11 connected with a cable 12 which is in turn connected with a worm rod 13. The motor 1 is disposed within the trunk (not shown) of a car. Further, the motor 1 is connected with a switch (not shown) mounted near the driver seat (not shown). In addition, the motor 1 is designed so that it will stop rotating when the actuating cylinder 6 moves to its upper or lower dead point. Hence, the current passing through the motor 1 will become larger and a sensor (not shown) will be actuated to turn off the motor 1.

The collar 2 includes a circular member 21 and a tubular member 22 formed at one side thereof. The tubular member 22 is formed with a hole 221 which is in communication with an opening 221 of the circular member 21. Both ends of the tubular member 22 are provided with external threads 222 engageable with a nut 223. At each of the two connections between the circular member 21 and the tubular member 22 there is a projection 212. Further, there is a third projection 212 on the circular member 21 midway between the first two projections 212. Between two projections 212 there is a lug 23 with a threaded hole 231. The lug 23 is engaged with a connecting block 24 which is formed with a recess 241 for receiving the lug 23. The connecting block 24 has a protuberance 242 at the top and an inclined shoulder 243 at both sides thereof. The bottom of the circular member 21 is formed with a shoulder 25 which extends inward to form a flange 26 on which is mounted a rubber packing 27. Further, the flange 26 is provided with two notches 261.

The sleeve 3 is a tubular member with an upper flange 31 having four holes 32 on the top and a flange 33 on the bottom. In addition, there are two protuberances 34 on the outer surface of the sleeve 3.

The worm gear 4 is formed with a hole 41 at the center and threads 42 on the wall of the hole 41. Besides, the outer diameter of the worm gear 4 is equal to the diameter of the opening 211 of the circular member 21 so that the worm gear 4 may be mounted on the shoulder 25 of the circular member 21 and the upper flange 31 of the sleeve 3. The annular member 5 is provided with a center hole 54 and three lugs 51 each aligned with a corresponding protuberance 212 of the collar 2 and having a hole 52 so that the annular member 5 may be mounted on the circular member 21 by screws 53. In addition, the center hole 54 of the annular member 5 has a larger diameter than the worm gear 4 thereby preventing the worm gear 4 from dropping out thereof.

The actuating cylinder 6 includes a body 63 with a top flange 61 and external threads 62 below the top flange 61. Further, the top flange 61 has two lugs 64 and the lower part of the actuating cylinder 6 is engaged with a rubber ring 65 which has a lower end extending outwards and downwards.

The cover 7 includes a seat 71 with a groove 711 at the bottom and a positioning plate 72 on the top. The positioning plate 72 extends outward to form a block 73 with a hole 731. Further, a rubber packing 74 is fitted within the groove 711 of the seat 71. The bottom of the seat 71 has three grooves 712 aligned with the three protuberances 212 of the collar 2. A through hole 75 extends through the positioning plate 72 and the seat 71. The through hole 75 is formed with a conical hole 751 at the lower portion. The upper diameter of the conical hole 751 is larger than the lower diameter of the conical hole and smaller than the diameter of the through hole 75. A transverse groove 752 is formed beneath the conical hole 751. A groove 753 extends across the diameter of the upper side of the through hole 75. In the through hole 75 are respectively disposed a steel ball 76, a plug 77, and a spring 78 which form a pressure relief valve. The plug 77 is composed of an upper circular member 771 and a lower circular member 772 which is larger than the upper member 771. The lower member 772 of the plug 77 is formed with an inclined surface 7721. The upper member 771 and the lower member 772 is formed with conical hole 773 extending the center thereof. Further, the positioning plate 72 is threadedly engaged with a press plate 79 which may be inserted into the recess 713 of the seat 73 at one end and fixedly connected with the positioning plate 72 via a screw 791 extending through the threaded hole 792 of the press plate 79 and the threaded hole 721 of the positioning plate 72. The screw 791 is connected with a linking rod 794 via a ring 793 which is in turn connected with a fixing plate 795.

Figure 4:
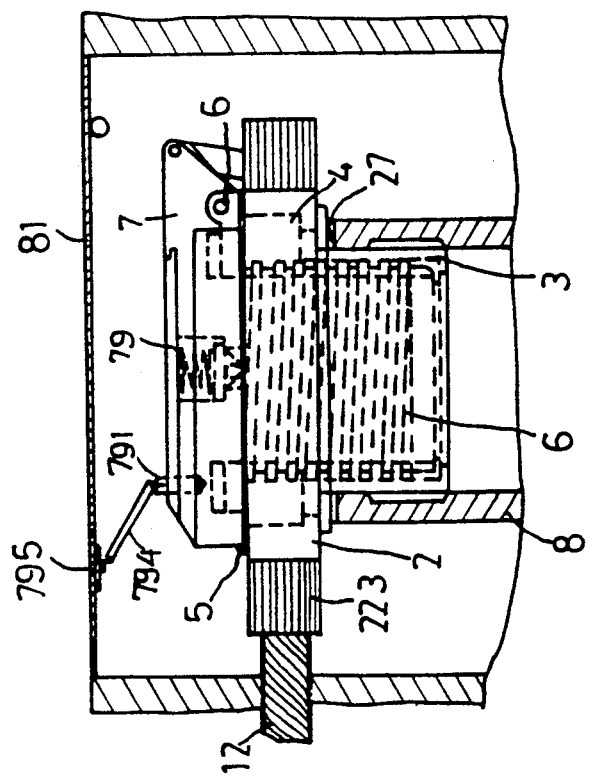
FIG. 4 is a working view of the present invention.
Figure 3:
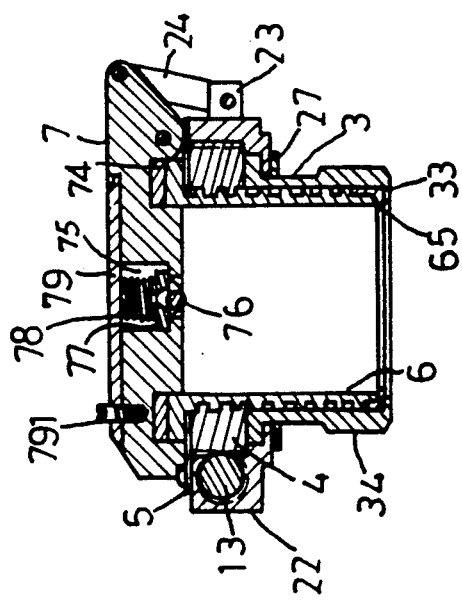
FIG. 3 is a sectional view of the present invention.

Looking now at FIGS. 3 and 4, when in assembly, first insert the worm rod 13 into the tubular member 22 of the collar 2. Then, dispose the sleeve 3 into the collar 2 through the center hole 221 so that the protuberances 34 of the sleeve 3 are engaged with the notches 261 of the collar 2 and the upper flange 31 of the sleeve 3 is supported on the flange 26 of the collar 2 and lies on the same plane as the shoulder 25 of the collar 2. In the meantime, the rubber packing 27 is fitted on the flange 26 of the collar 2. Thereafter, use a pair of long-nose pliers (not shown) to hold the hole 32 of the sleeve 3 to fit the sleeve 3 into a fuel tank outlet (not shown) and turn the sleeve 3 to engage the protuberances 34 with grooves (not shown) of the fuel tank outlet. Afterwards, the annular 5 is sleeved under the top flange 61 of the actuating cylinder 6 and engage the worm gear 4 with the threads 62 of the actuating cylinder 6 and engage the rubber packing 65 with the lower portion of the actuating cylinder 6. Then, put the actuating cylinder 6 into the center hole 211 of the collar 2 so that the rubber packing 65 at the lower portion of the actuating cylinder 6 is just in contact with the flange 33 of the sleeve 3. Meanwhile, the worm gear 4 is just supported on a plane formed by the shoulder 25 of the collar 2 and the upper flange 31 of the sleeve 3 and the worm gear 4 is engaged with the worm rod 13 through the opening 211 of the collar 2. Then, the annular member 5 is fixedly mounted on the circular member 21 of the collar 2 by screws 53 so that the worm gear 4 is enclosed within the collar 2. Then the connecting member 24 is engaged with the lug 23 of the collar 2 via a pin 245. Thereafter, the lid 7 is engaged with the connecting member 24 via a pin 732 and with the actuating cylinder 6 via a pin 66. Finally, join the fixing plate 795 with the fuel tank cover (not shown) by screws or the like.

Figure 5:
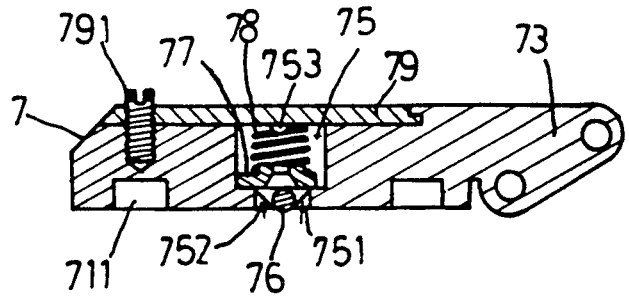
FIG. 5 is a sectional view of a pressure relief valve of the present invention.

Normally (see FIG. 5), the spring 78 urges the plug 77 to go upwardly against the top of the conical hole 751 of the lid 7 and the steel ball 76 is located at the bottom of the conical hole 751. As some of the gasoline is consumed, the air will flow through the hole 75 of the lid 7 via the grooves 753 and then through the hole 773 of the plug 77. Although the conical hole 751 is blocked by the steel ball 76, the air may still pass through the transverse grooves 752 into the fuel tank so as to keep pressure equilibrium between the inside and outside of the fuel tank.

Figure 6:
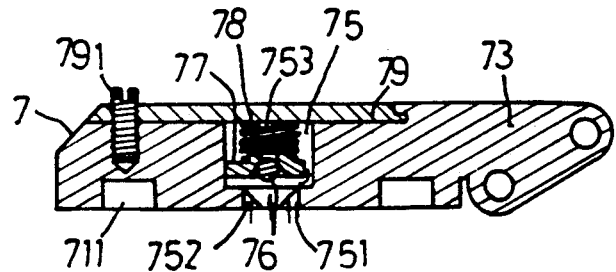
FIG. 6 shows the working principle of the pressure relief valve of the present invention.

As the temperature inside the fuel tank is increased due to the rocking of the car, the pressure within the fuel tank will be increased thereby pushing the steel ball 76 to go upwardly against the conical hole 773 of the plug 77. In case the pressure exceeds the resilience of the spring 78, the plug 77 will be pushed upwardly to compress the spring 78 so that the plug 77 will be separated from the top of the conical hole 751. Since the plug 77 is formed with an inclined surface 7721, the air may go out of the grooves 753 through the inclined surface 7721 thus keeping pressure equilibrium between the inside and outside of the fuel tank. Then the steel ball 76 falls down into the conical hole 751 and the plug 77 returns to its original position (see FIG. 6).

Figure 7A:
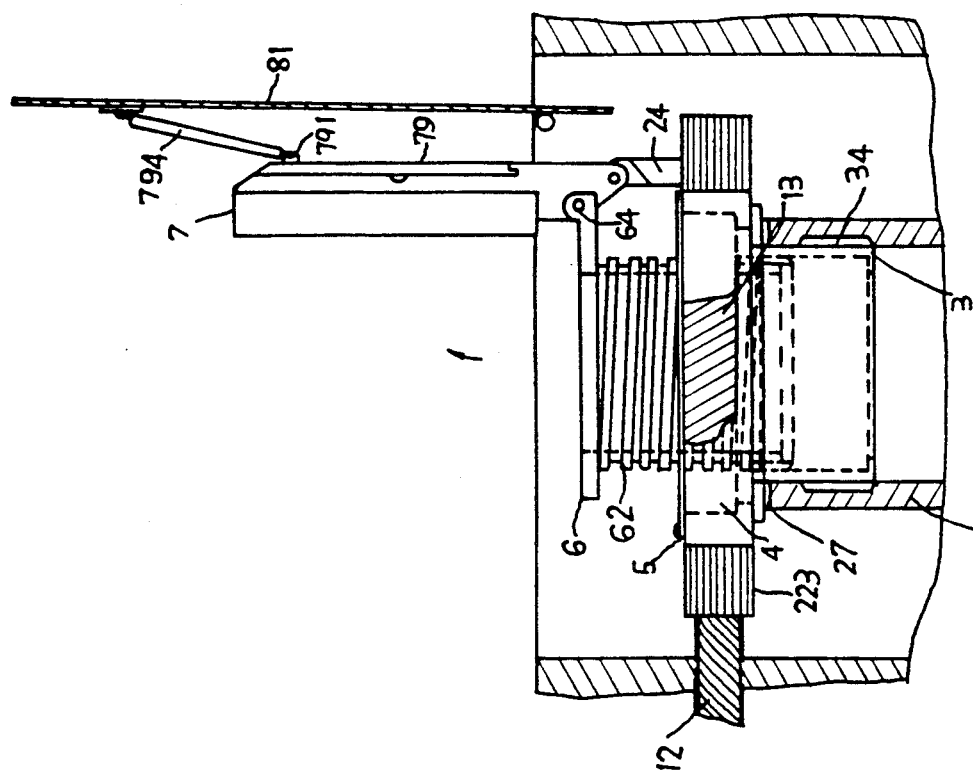
FIGS. 7 and 7A show the working principle of the present invention.
Figure 7:
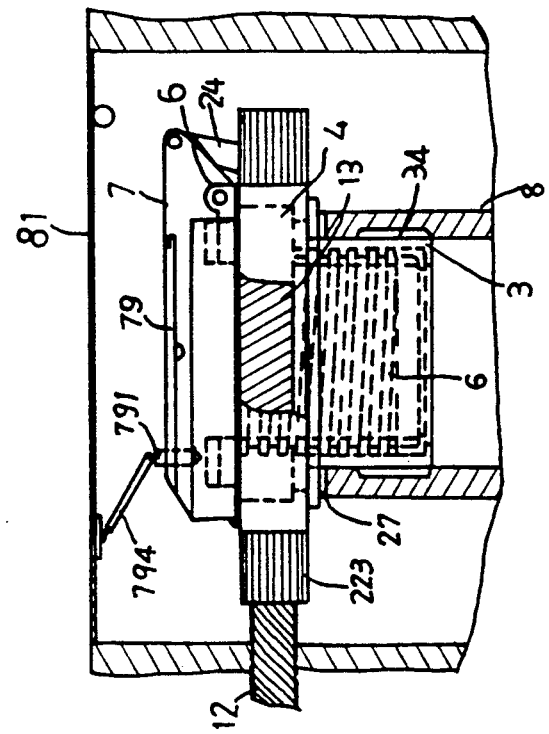

When desired to open the fuel tank cover, simple turn on a switch (not shown) which is mounted near the driver seat and electrically connected with the motor 1. Then, the axle 11 will rotate the cable 12 which will in turn rotate the worm rod 13. In the meantime, the worm gear 14 is rotated and the actuating cylinder 6 will be lifted upwards thereby moving the lid 7 to a vertical position (see FIGS. 7 and 7A). As the fuel tank cover 81 is connected with the fixing plate 795, the fuel tank cover 81 will be pushed open. At that time, the motor 1 will stop automatically and an oil gun (not shown) may be inserted the fuel tank through the present invention. When desired to close the fuel tank cover, simply turn on the motor 1 so that the motor will rotate in an opposite direction. Then, the worm gear 4 will also rotate in an opposite direction by the worm rod 13 hence lowering the actuating cylinder 6. Thereafter, the lid 7 will return to its original position and the fuel tank cover 81 will be pulled close. Meanwhile, the motor 1 will stop automatically.

The rubber packing 65 is used to ensure no clearance between the actuating cylinder 6 and the sleeve 3. As the actuating cylinder 6 is lowered down to close the fuel tank cover 81, the rubber packing 65 will be deformed to further engage between the actuating cylinder 6 and the sleeve 3. The rubber packings 27 and 74 are designed to further prevent the oil from leaking out of the present invention.

Figure 9:
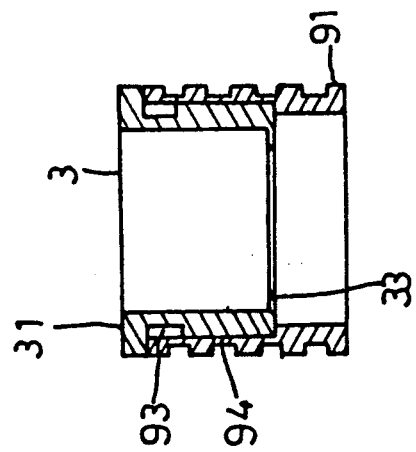
FIG. 9 is a sectional view showing the engagement between the threaded ferrule and the sleeve of the present invention.
Figure 8:
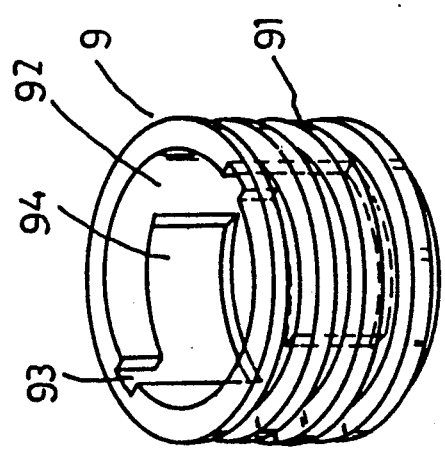
FIG. 8 is a perspective view of a threaded ferrule of the present invention.

In case the fuel tank cover is threaded engaged with the fuel tank inlet 8 (not shown), simple fit a threaded ferrule 9 over the sleeve 3. The threaded member 9 is provided with external threads 91 and has a center hole 92 with grooves 93 and 94 adapted to receive protuberances 34 of the sleeve 3. Hence, the sleeve 3 may be firmly engaged with the threaded ferrule 9 as shown in FIG. 9 and the present invention may be turned into engagement with the fuel tank inlet 8.

Although the present invention has been described with a certain degree of particularity, it is understood that the present invention disclosure is made by way of example only and that numerous changes in the detail of construction and the combination and arrangement of parts may be resorted to without departing from the spirit and scope of the invention as hereinafter claimed.

I claim:

1. A power fuel tank cover comprising:
   a motor;
   a collar having a circular member and a tubular member formed at one side thereof, said tubular member being formed with a hole which is in communication with an opening of the circular member;
   a worm rod inserted into the tubular member of said collar;
   a sleeve fitted into said collar;
   a worm gear mounted on said sleeve and engaged with said worm rod, said worm gear having a center hole with internal threads;
   an actuating cylinder with external threads being engaged with the center hole of said worm gear;

a lid pivotally connected with an upper portion of said actuating cylinder and having a seat with a groove at a bottom, a positioning plate on a top and a hole extending through said seat and said positioning plate for receiving a ball, a plug, and a spring, said positioning plate extending outward to form a block;

a connecting member pivotally connected between said collar and said lid; and a press plate threadedly engaged with the positioning plate by a screw connected with a linking rod via a ring which is in turn connected with a fixing plate, said fixing plate being designed to engage with a fuel tank cover;

wherein the motor, when activated, rotates an axle connected to a cable which in turn rotates the worm rod, causing the worm gear to activate the actuating cylinder, thus urging the lid to a position perpendicular to the collar, thereby causing the fuel tank cover, to open inasmuch as the lid is connected to the fuel tank cover via the fixing plate and the linking rod.

2. The power fuel tank cover as claimed in claim 1, wherein said connecting member is provided with an inclined shoulder at both sides.

3. The power fuel tank cover as claimed in claim 1, wherein said actuating cylinder has a lower portion with a smooth surface engaged with a rubber packing.

4. the power fuel tank cover as claimed in claim 1, wherein said plug is composed of an upper circular member and a lower circular member with an inclined surface.

5. The power fuel tank cover as claimed in claim 1, wherein said plug is formed with a conical hole at a center thereof.

* * * * *